(12) United States Patent
Rosa et al.

(10) Patent No.: US 11,611,866 B2
(45) Date of Patent: Mar. 21, 2023

(54) CONNECTION BETWEEN SIM-LESS DEVICE AND CELLULAR NETWORK

(71) Applicant: Nokia Technologies Oy, Espoo (FI)

(72) Inventors: Claudio Rosa, Anders (DK); Troels Emil Kolding, Klarup (DK); Bo Holm Bjerrum, Nibe (DK); Laurent Thiebaut, Antony (FR); Betsy Covell, Chicago, IL (US)

(73) Assignee: Nokia Technologies Oy, Espoo (JP)

( * ) Notice: Subject to any disclaimer, the term of this patent is extended or adjusted under 35 U.S.C. 154(b) by 220 days.

(21) Appl. No.: 17/174,285

(22) Filed: Feb. 11, 2021

(65) Prior Publication Data
US 2022/0256330 A1 Aug. 11, 2022

(51) Int. Cl.
*H04W 8/20* (2009.01)
*H04W 12/06* (2021.01)
*H04W 4/50* (2018.01)
*H04W 76/14* (2018.01)

(52) U.S. Cl.
CPC ............. *H04W 8/205* (2013.01); *H04W 4/50* (2018.02); *H04W 12/06* (2013.01); *H04W 76/14* (2018.02)

(58) Field of Classification Search
CPC ....... H04W 8/205; H04W 4/50; H04W 12/06; H04W 76/14; H04W 4/60; H04W 92/18
See application file for complete search history.

(56) References Cited

U.S. PATENT DOCUMENTS

| 10,536,840 B2 | 1/2020 | Lipovkov | |
|---|---|---|---|
| 2015/0327063 A1* | 11/2015 | Van Phan | H04W 12/06 455/411 |
| 2019/0230224 A1* | 7/2019 | Al Hajri | H04W 4/00 |

FOREIGN PATENT DOCUMENTS

EP 2530960 A1 * 12/2012 ............ H04W 12/06

OTHER PUBLICATIONS

3GPP TR 22.858 v0.2.0 (Nov. 2020) 3rd Generation Partnership Project; Technical Specification Group Services and System Aspects; Study of enhancements for Residential 5G; Stage 1 (Release 18).
(Continued)

*Primary Examiner* — Joseph E Dean, Jr.
(74) *Attorney, Agent, or Firm* — Duft & Bornson, PC

(57) ABSTRACT

Systems, methods, and software of directly connecting a SIM-less device with a cellular network. In one embodiment, User Equipment (UE) includes a Subscriber Identity Module (SIM) provisioned with a plurality of subscription profiles for subscriptions to the cellular network. The UE establishes a direct communication with a SIM-less device that does not have a subscription with the cellular network. The UE selects one of the subscriptions provisioned in the SIM as a temporary subscription assigned to the SIM-less device to allow the SIM-less device to establish a direct connection with the cellular network using the temporary subscription, and transmits a message to the SIM-less device via the direct communication containing subscription credentials for the temporary subscription. The SIM-less device may therefore register with the cellular network using the subscription credentials provided by the UE, and establish a direct connection with the cellular network using the temporary subscription.

20 Claims, 9 Drawing Sheets

(56) References Cited

OTHER PUBLICATIONS

3GPP TS 22.261 v18.1.1 (Jan. 2021) 3rd Generation Partnership Project; Technical Specification Group Services and System Aspects; Service requirements for the 5G system; Stage 1 (Release 18).
3GPP TS 23.122 v17.1.1 (Jan. 2021) 3rd Generation Partnership Project; Technical Specification Group Core Network and Terminals; non-Access-Stratum (NAS) functions related to Mobile Station (MS) in idle mode (Release 17).
3GPP TS 23.501 V16.7.0 Dec. 2020; 3rd Generation Partnership Project; Technical Specification Group Services and System Aspects; system architecture for the 5G System (5GS) Stage 2 (Release 16).
3GPP TS 23.502 v16.7.1 (Jan. 2021) 3rd Generation Partnership Project; Technical Specification Group Services and System Aspects; Procedures for the 5G System (5GS) Stage 2 (Release 16).
3GPP TS 24.501 v17.1.0 (Dec. 2020) 3rd Generation Partnership Project; Technical Specification Group Core Network and Terminals; Non-Access-Stratum (NAS) protocol for 5G System (5GS); Stage 3; (Release 17).
3GPP TS 33.102 v16.0.0 (Jul. 2020) 3rd Generation Partnership Project; Technical Specification Group Services and System Aspects; 3G Security; Security architecture (Release 16).
3GPP TS 33.501 v17.0.0 (Dec. 2020) 3rd Generation Partnership Project; Technical Specification Group Services and System Aspects; Security architecture and procedures for 5G system (Release 17).

* cited by examiner

CONNECTION BETWEEN SIM-LESS DEVICE AND CELLULAR NETWORK

TECHNICAL FIELD

This disclosure is related to the field of communication systems and, in particular, to cellular networks.

BACKGROUND

End users typically have multiple devices that are configured to access data services, such as streaming audio, streaming video, online gaming, etc. One example of a user device is a mobile phone (e.g., User Equipment (UE)) or smartphone. A mobile phone includes functionalities for communicating with a cellular network or mobile network via radio signals to access voice and/or data services. For instance, the mobile phone includes a Subscriber Identity Module (SIM) that contains a subscription identifier, personal security keys, etc., used to uniquely identify a subscription and to mutually authenticate the mobile phone and the cellular network. A typical mobile phone also includes functionalities for communicating with other types of networks or devices via wireless signals, such as WiFi, Bluetooth, etc. When accessing a data service, a user can select whether the mobile phone uses the cellular network for the data service, or another data network (e.g., a WiFi network). For example, when the cellular network and a WiFi network are both in range of a mobile phone, a user may opt to select the WiFi network for a data service to avoid consuming data from their subscription, to potentially have access to a higher bandwidth, etc. When no WiFi network is available, the user may select the cellular network for a data service.

Another example of a user device is a tablet (e.g., WiFi only), a digital media player (e.g., Roku, Apple TV, Fire TV, etc.), a smart TV, etc. These types of user devices may include functionalities for communicating with a non-cellular network (e.g., WiFi network) to access data services. However, these types of user devices do not have a subscription (i.e., they do not have a SIM) with a cellular network that allows for communication with the cellular network. Thus, these types of user devices may be referred to as SIM-less devices. One issue with such a SIM-less device is that when a WiFi network is not available, is not in range, has a weak signal, etc., different solutions are needed to allow the SIM-less device to access a data service. For example, the SIM-less device may establish a direct connection with a SIM-device to access a data service. The SIM device may create a personal hotspot, and the SIM-less device may access the personal hotspot of the SIM device to access data services. Alternatively, the SIM-device may stream content directly to the SIM-less device (e.g., Google Cast, Apple AirPlay, etc.). In these types of scenarios, the SIM-less device is tethered to the SIM device in order for the SIM-less device to access a data service. Thus, the media content is first downloaded to the SIM device using a cellular radio connection (e.g., 4G/5G), and then streamed from the SIM device to the SIM-less device using WiFi radio signals, Bluetooth signals, or other radio signals. Some disadvantages of a tethered relationship such as this are high power consumption for the SIM device (i.e., simultaneous reception of the data flow via the cellular radio connection and transmission of the data flow to the SIM-less device), impact on the available data throughput and Quality of Experience (QoE), reduction of processing capability at the SIM device to run other applications, etc.

With the ever-growing volume of data services available to users, it is desirable to identify additional solutions that allow SIM-less devices to provide data services even when WiFi networks or the like are not available.

SUMMARY

Described herein is a solution that allows a SIM-less device to directly connect with a cellular network by temporarily utilizing a subscription from a SIM device. As an overview, a UE (e.g., mobile phone or smartphone) of a user has a SIM provisioned with multiple subscriptions, and the UE grants a SIM-less device temporary access to one of the subscriptions. The UE provides subscription credentials for the temporary subscription to the SIM-less device, and the SIM-less device uses the subscription credentials to register with the cellular network. Thus, the SIM-less device can directly access the cellular network using the temporary subscription of the UE to provide a data service. One technical benefit is that the UE is not tethered to the SIM-less device when providing the data service. This reduces power consumption at the UE, avoids potential throughput issues at the UE, reduces processing load at the UE, etc.

One embodiment comprises a UE that includes a SIM provisioned with a plurality of subscription profiles for subscriptions to a cellular network, at least one radio transceiver configured to communicate via radio signals, and at least one processor and memory. The processor causes the UE to establish a direct communication with a SIM-less device using the at least one radio transceiver. The SIM-less device does not have a subscription with the cellular network. The processor causes the UE to select one of the subscriptions provisioned in the SIM as a temporary subscription assigned to the SIM-less device to allow the SIM-less device to establish a direct connection with the cellular network using the temporary subscription, and transmit a message to the SIM-less device via the direct communication containing subscription credentials for the temporary subscription.

In another embodiment, the processor causes the UE to receive a subscription request from the SIM-less device via the direct communication requesting access to a subscription provisioned in the SIM, select the temporary subscription assigned to the SIM-less device in response to receiving the subscription request, and transmit a subscription response to the SIM-less device via the direct communication containing the subscription credentials for the temporary subscription.

In another embodiment, the subscription request from the SIM-less device includes an indicator of a particular subscription provisioned in the SIM. The processor causes the UE to select the temporary subscription assigned to the SIM-less device based on the indicator in the subscription request.

In another embodiment, the subscription credentials include a subscription permanent identifier. The processor causes the UE to conceal the subscription permanent identifier in a subscription concealed identifier, and transmit the message to the SIM-less device via the direct communication containing the subscription concealed identifier.

In another embodiment, the processor causes the UE to set a subscription profile for the temporary subscription as active for use by the SIM-less device.

In another embodiment, the processor causes the UE to receive a verification request from the SIM-less device via the direct communication containing authentication request parameters generated by the cellular network, generate authentication response parameters, and transmit a verification response to the SIM-less device via the direct communication containing the authentication response parameters.

In another embodiment, the processor causes the UE to detect a condition to revoke the temporary subscription assigned to the SIM-less device, and transmit a revoke request to the SIM-less device via the direct communication containing an instruction to tear down the direct connection with the cellular network.

In another embodiment, the processor causes the UE to detect a condition to revoke the temporary subscription assigned to the SIM-less device, and transmit a revoke request to the cellular network to tear down the direct connection with the SIM-less device.

In another embodiment, the revoke request to the cellular network comprises a deregister request to deregister the SIM-less device from the temporary subscription.

Another embodiment comprises a method of operating a UE to facilitate a direct connection between a SIM-less device and a cellular network. The UE includes a SIM provisioned with a plurality of subscription profiles for subscriptions to the cellular network. The method comprises establishing a direct communication with the SIM-less device using a radio transceiver in the UE, selecting one of the subscriptions provisioned in the SIM as a temporary subscription assigned to the SIM-less device to allow the SIM-less device to establish the direct connection with the cellular network using the temporary subscription, and transmitting a message from the UE to the SIM-less device via the direct communication containing subscription credentials for the temporary subscription.

In another embodiment, the method further comprises receiving a subscription request at the UE from the SIM-less device via the direct communication requesting access to a subscription provisioned in the SIM. The step of selecting one of the subscriptions provisioned in the SIM as the temporary subscription assigned to the SIM-less device comprises selecting the temporary subscription in response to receiving the subscription request. The step of transmitting the message from the UE to the SIM-less device via the direct communication comprises transmitting a subscription response from the UE to the SIM-less device via the direct communication containing the subscription credentials for the temporary subscription.

In another embodiment, the subscription request from the SIM-less device includes an indicator of a particular subscription provisioned in the SIM. The step of selecting one of the subscriptions provisioned in the SIM as the temporary subscription assigned to the SIM-less device comprises selecting the temporary subscription assigned to the SIM-less device based on the indicator in the subscription request.

In another embodiment, the subscription credentials include a subscription permanent identifier, and the method further comprises concealing the subscription permanent identifier in a subscription concealed identifier. The step of transmitting the message from the UE to the SIM-less device via the direct communication comprises transmitting the message from the UE to the SIM-less device via the direct communication containing the subscription concealed identifier.

In another embodiment, the method further comprises receiving a verification request at the UE from the SIM-less device via the direct communication containing authentication request parameters generated by the cellular network, generating authentication response parameters at the UE, and transmitting a verification response from the UE to the SIM-less device via the direct communication containing the authentication response parameters.

In another embodiment, the method further comprises detecting a condition to revoke the temporary subscription assigned to the SIM-less device, and transmitting a revoke request from the UE to the SIM-less device via the direct communication containing an instruction to tear down the direct connection with the cellular network.

In another embodiment, the method further comprises detecting a condition to revoke the temporary subscription assigned to the SIM-less device, and transmitting a revoke request from the UE to the cellular network to tear down the direct connection with the SIM-less device.

Another embodiment comprises a UE or other communication device with access to a cellular network that includes a SIM provisioned with a plurality of subscription profiles for subscriptions to the cellular network. The UE includes a means for communicating via radio signals. The UE includes a means for establishing a direct communication with a SIM-less device via radio signals. The UE includes a means for selecting one of the subscriptions provisioned in the SIM as a temporary subscription assigned to the SIM-less device to allow the SIM-less device to establish a direct connection with the cellular network using the temporary subscription. The UE includes a means for transmitting a message to the SIM-less device via the direct communication containing subscription credentials for the temporary subscription.

Another embodiment comprises a SIM-less device that includes a SIM-less platform devoid of a SIM provisioned with a subscription to a cellular network. The SIM-less platform comprises at least one a radio transceiver configured to communicate via radio signals, and at least one processor and memory. The processor causes the SIM-less device to establish a direct communication with a UE using the at least one radio transceiver. The UE has a SIM provisioned with a plurality of subscription profiles for subscriptions to the cellular network. The processor causes the SIM-less device to receive a message from the UE via the direct communication containing subscription credentials for one of the subscriptions selected by the UE as a temporary subscription assigned to the device, to register with the cellular network using the subscription credentials provided by the UE, and establish a direct connection with the cellular network using the temporary subscription.

In another embodiment, the processor causes the SIM-less device to transmit a subscription request to the UE via the direct communication requesting access to a subscription provisioned in the SIM, and receive a subscription response from the UE via the direct communication containing the subscription credentials.

In another embodiment, the subscription credentials received in the message from the UE include a subscription permanent identifier concealed in a subscription concealed identifier.

In another embodiment, the processor causes the SIM-less device to transmit a registration request to the cellular network containing the subscription credentials for the temporary subscription, receive an authentication request from the cellular network containing authentication request parameters generated by the cellular network, transmit a verification request to the UE via the direct communication containing the authentication request parameters, receive a verification response from the UE via the direct communication containing authentication response parameters generated by the UE, and transmit an authentication response to the cellular network containing the authentication response parameters generated by the UE.

In another embodiment, the processor causes the SIM-less device to receive a revoke request from the UE via the direct communication containing an instruction to tear down the direct connection with the cellular network, and tear down the direct connection with the cellular network in response to the instruction.

Another embodiment comprises a method of establishing a direct connection between a SIM-less device and a cellular network. The method comprises establishing a direct communication with a UE via a radio transceiver, receiving a message from the UE via the direct communication containing subscription credentials for one of the subscriptions selected by the UE as a temporary subscription assigned to the SIM-less device, registering with the cellular network using the subscription credentials provided by the UE, and establishing a direct connection with the cellular network using the temporary subscription.

In another embodiment, the method further comprises transmitting a subscription request from the SIM-less device to the UE via the direct communication requesting access to a subscription provisioned in the SIM, and receiving a subscription response at the SIM-less device from the UE via the direct communication containing the subscription credentials.

In another embodiment, the subscription credentials received in the message from the UE include a subscription permanent identifier concealed in a subscription concealed identifier.

In another embodiment, the method further comprises transmitting a registration request from the SIM-less device to the cellular network containing the subscription credentials for the temporary subscription, receiving an authentication request at the SIM-less device from the cellular network containing authentication request parameters generated by the cellular network, transmitting a verification request from the SIM-less device to the UE via the direct communication containing the authentication request parameters, receiving a verification response at the SIM-less device from the UE via the direct communication containing authentication response parameters generated by the UE, and transmitting an authentication response from the SIM-less device to the cellular network containing the authentication response parameters generated by the UE.

In another embodiment, the method further comprises receiving a revoke request at the SIM-less device from the UE via the direct communication containing an instruction to tear down the direct connection with the cellular network, and tearing down the direct connection with the cellular network in response to the instruction.

Another embodiment comprises a SIM-less device that includes a SIM-less platform devoid of a SIM provisioned with a subscription to a cellular network. The SIM-less device comprises a means for establishing a direct communication with a UE using via a radio transceiver. The SIM-less device comprises a means for receiving a message from the UE via the direct communication containing subscription credentials for one of the subscriptions selected by the UE as a temporary subscription assigned to the device. The SIM-less device comprises a means for registering with the cellular network using the subscription credentials provided by the UE, and a means for establishing a direct connection with the cellular network using the temporary subscription.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
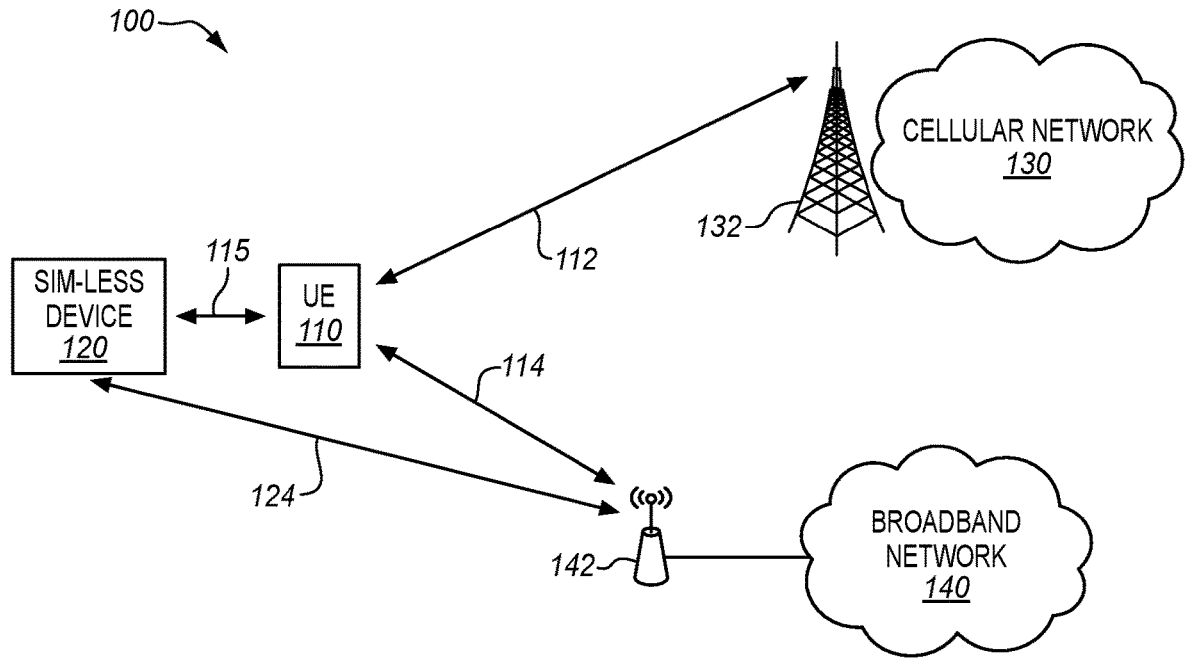
FIGS. 1-2 are schematic diagrams of a data communications environment in an illustrative embodiment.
Figure 2:
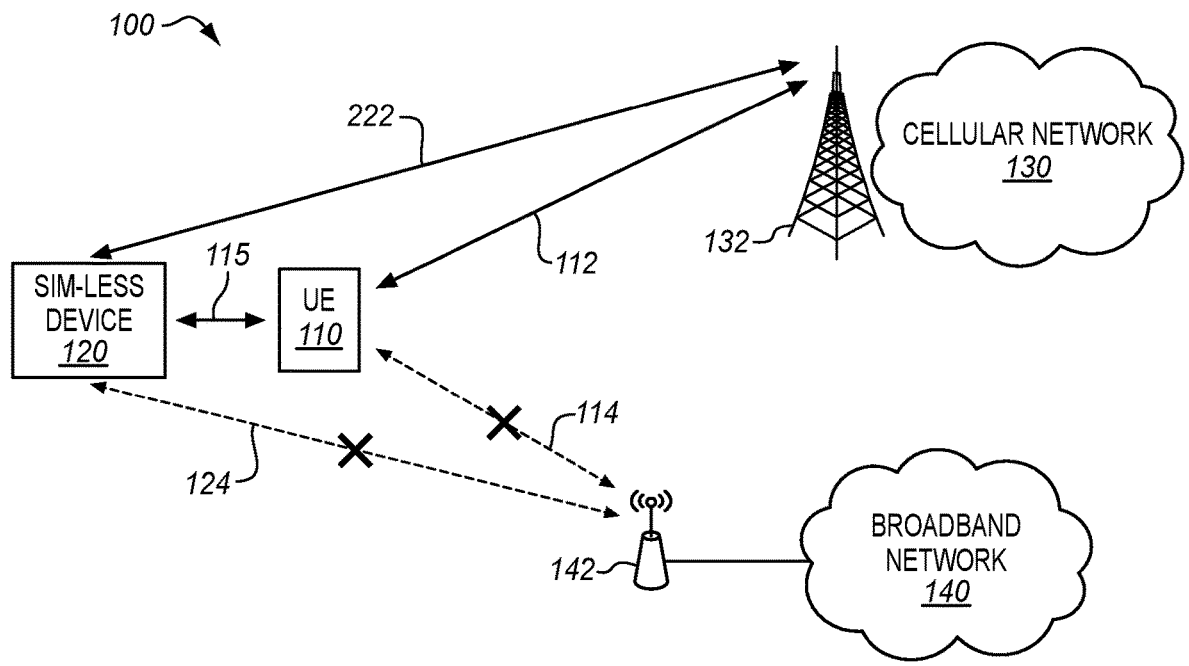

FIGS. 1-2 are schematic diagrams of a data communications environment 100 in an illustrative embodiment. In FIG. 1, it is assumed that multiple end user devices are used in data communications environment 100. The end user devices include a UE 110 and a SIM-less device 120. Data communications environment 100 also includes a cellular network 130 and a broadband network 140. Cellular network 130 (also referred to as a mobile network) is a telecommunication network of a carrier, where the last link is wireless. Cellular network 130 is a wide area network that provides service in the form of cells over a wide area via a plurality of base stations 132. Broadband network 140 is a high-speed network that provides access to the Internet and other types of services. Broadband network 140 may be fixed or mobile, and may use technologies such as Digital Subscriber Line (DSL), cable modem, fiber, satellite, etc. A wireless access point (WAP) 142 creates a Wireless Local Area Network (e.g., WiFi network) that interfaces devices with broadband network 140.

UE 110 is an end user device, such as a mobile phone (e.g., smartphone) or mobile device, a tablet or PDA, a computer with a mobile broadband adapter, etc., that is configured to communicate with a base station 132 of a cellular network 130 via cellular radio signals (also referred to as radio signals over 3GPP access). UE 110 includes a SIM that stores network-specific information used to authenticate and identify a subscriber or subscription to cellular network 130. Thus, UE 110 is able to establish a direct connection 112 (also referred to as a cellular connection) with cellular network 130 for a data session. UE 110 may also be configured to communicate with wireless access point 142 of broadband network 140 via WiFi radio signals or another radio protocol, to establish a direct connection 114 (also referred to as a WiFi connection) with broadband network 140.

SIM-less device 120 is an end user device, such as a tablet (e.g., WiFi only), a digital media player, a smart TV, etc. SIM-less device 120 may be configured to communicate with wireless access point 142 of broadband network 140 via WiFi radio signals or another radio protocol to establish a direct connection 124 (also referred to as a WiFi connection) with broadband network 140. SIM-less device 120 also supports cellular radio and signaling protocols for communicating with cellular network 130. However, SIM-less device 120 does not include a SIM as does UE 110. Thus, SIM-less device 120 does not have a subscription with cellular network 130, and is not able to register directly with cellular network 130.

UE 110 and SIM-less device 120 are also configured to establish a direct communication 115 with one another. Direct communication 115 may be a device-to-device (D2D) or peer-to-peer communication between two devices in proximity by means of user data plane transmissions using cellular radio technology (e.g., E-UTRA or 5G New Radio (NR)) also referred to a PC5 or NR sidelink, or Bluetooth, Wi-Fi Direct, or another protocol. SIM-less device 120 may be pre-provisioned with credentials to establish a direct communication 115 with UE 110. Likewise, UE 110 may be pre-provisioned with the same credentials. Thus, when one of SIM-less device 120 or UE 110 requests a direct communication 115 with the other, the credentials may be used for mutual authentication and secure channel establishment (e.g., including Control Plane (CP) and User Plane (UP) security enablement).

When accessing a data service, SIM-less device 120 may communicate with broadband network 140 over direct connection 124. However, there may be situations where the WiFi network created by wireless access point 142 is not available, is not in range, has a weak signal, etc. In the embodiments described herein, SIM-less device 120 is able to connect to cellular network 130 using an external cellular subscription from UE 110, as is further illustrated in FIG. 2. UE 110 allows SIM-less device 120 to temporarily use one of its subscriptions to establish a data session with cellular network 130. Using a subscription held by UE 110, SIM-less device 120 exchanges signaling with cellular network 130 to establish a direct connection 222 (also referred to as a cellular connection) with cellular network 130. A direct connection 222 means that data flows directly between cellular network 130 and SIM-less device 120, without going through UE 110.

Figure 3:
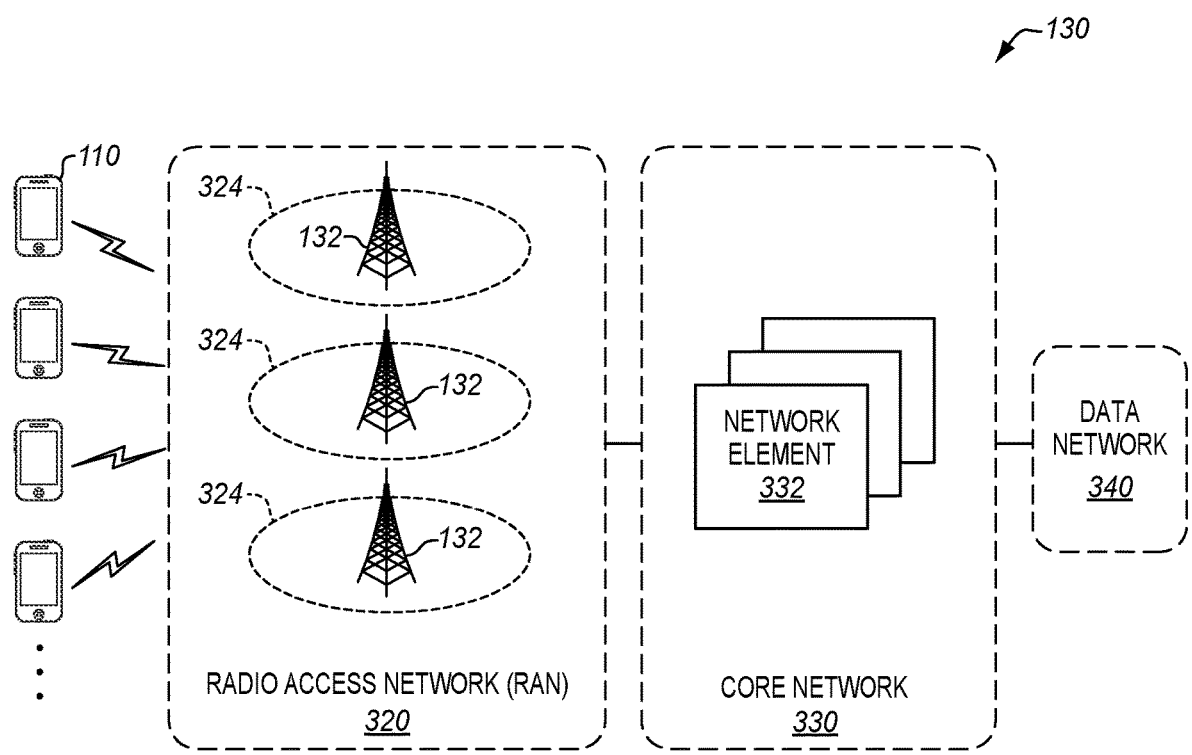
FIG. 3 illustrates a cellular network in an illustrative embodiment.

FIG. 3 further illustrates cellular network 130 in an illustrative embodiment. Cellular network 130 may comprise a Fourth Generation (4G) network (e.g., a Long-Term Evolution (LTE) network), a next-generation network (e.g., Fifth Generation (5G) or later), or another type of network. Cellular network 130 provides voice, data, or other communication services to a plurality of UEs 110. Cellular network 130 includes one or more Radio Access Networks (RAN) 320 that communicate with UEs 110 over a radio interface. RAN 320 may support Evolved-UMTS Terrestrial Radio Access Network (E-UTRAN) access, new Radio Access Technologies (RAT), etc. As an example, RAN 320 may comprise an E-UTRAN or Next Generation RAN (NG-RAN). RAN 320 includes a plurality of base stations 132 that are dispersed over a geographic area. A base station 132 comprises an entity that uses radio communication technology to communicate with a UE 110, and interface the UE 110 with a core network 330. Base station 132 includes equipment configured to interface with UEs 110 via the air interface, such as antennas, transmitters, receivers, etc., and equipment configured to interface with core network 330, such as routers, controllers, etc. Each base station 132 provides radio coverage to a cell 324 (or multiple cells). One or more of base stations 132 may communicate on the licensed spectrum or via 3GPP access. In one embodiment, one or more of base stations 132 may comprise an Evolved-NodeB (eNodeB) of an E-UTRAN. In another embodiment, one or more of base stations 132 may comprise a gNodeB (NR base stations) and/or ng-eNodeB (LTE base stations supporting a 5G Core Network) of an NG-RAN.

Core network 330 is the central part of cellular network 130 that interconnects RAN 320 with a data network 340. One example of core network 330 is the Evolved Packet Core (EPC) network as suggested by the 3GPP for LTE. Another example of core network 330 is a 5G core network as suggested by the 3GPP. Core network 330 includes a plurality of network elements 332 or network functions (NF), which may comprise servers, devices, equipment (including hardware), a software instance running on dedicated hardware, a virtualized function instantiated on an appropriate platform (e.g., a cloud infrastructure), etc. Network elements 332, in an EPC network, may comprise a Mobility Management Entity (MME), a Serving Gateway (S-GW), a Packet Data Network Gateway (P-GW), etc. Network elements 332, in a 5G network, may comprise an Access and Mobility Management Function (AMF), a Session Management Function (SMF), a Policy Control Function (PCF), an Application Function (AF), a User Plane Function (UPF), a Unified Data Management Network Function (UDM), a Unified Data Repository Network Function (UDR), etc. Core network 330 is able to access data network 340 to provide data services to UE 110, such as web browsing, online gaming, streaming video, streaming audio, etc. Data network 340 may be an operator external public or private data network, or an intra-operator data network (e.g., for IMS services). One example of data network 340 is the Internet.

Figure 4:
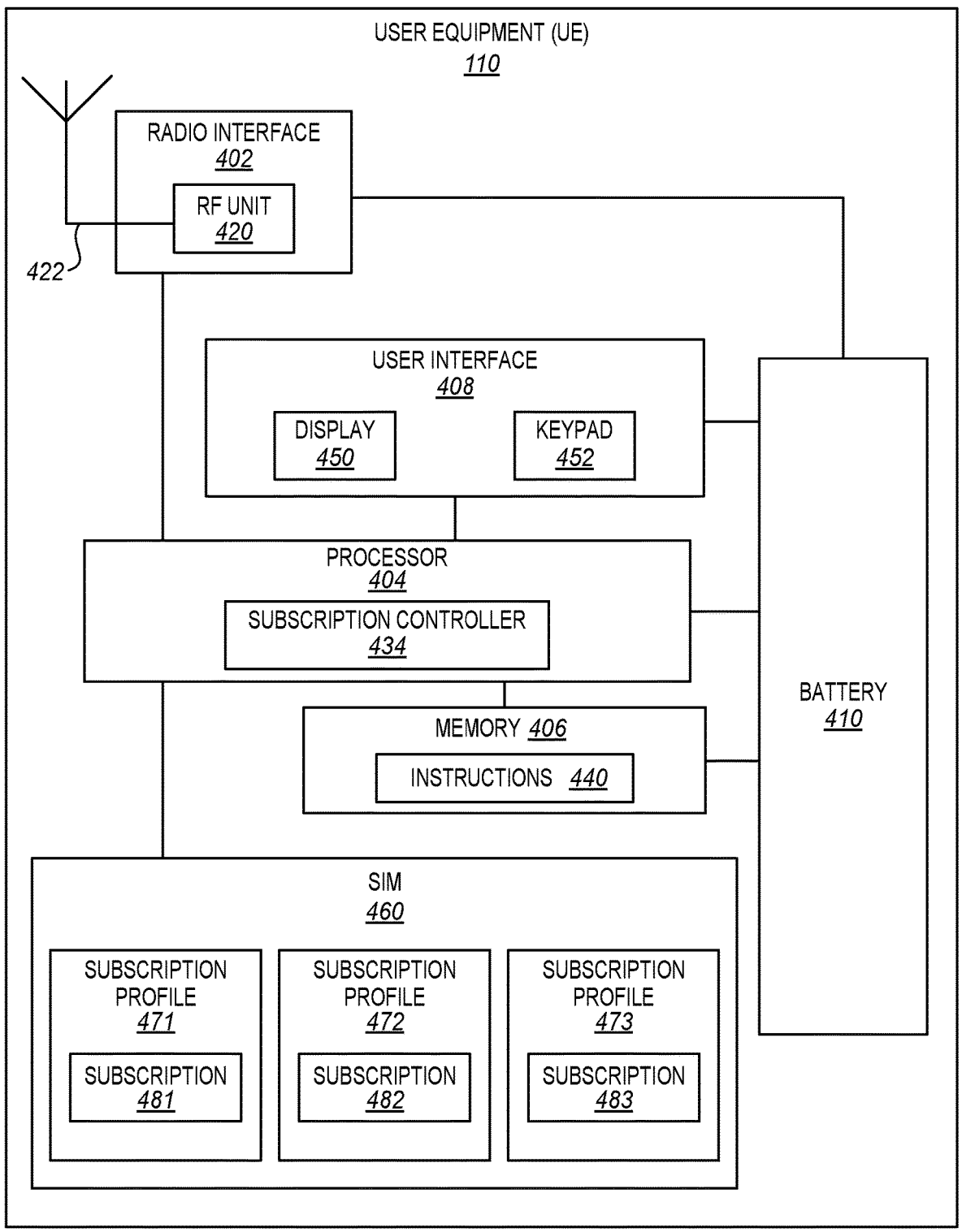
FIG. 4 is a block diagram of User Equipment (UE) in an illustrative embodiment.

FIG. 4 is a block diagram of a UE 110 in an illustrative embodiment. UE 110 includes a radio interface component 402, one or more processors 404, a memory 406, a user interface component 408, and a battery 410. Radio interface component 402 is a hardware component that represents the local radio resources of UE 110, such as an RF unit 420 (e.g., one or more radio transceivers) and one or more antennas 422. Radio interface component 402 may be configured for WiFi, Bluetooth, 5G NR, LTE, etc. Processor 404 represents the internal circuitry, logic, hardware, etc., that provides the functions of UE 110. Processor 404 may be configured to execute instructions 440 for software that are loaded into memory 406. Processor 404 may comprise a set of one or more processors or may comprise a multi-processor core, depending on the particular implementation. Memory 406 is a computer readable storage medium for data, instructions 440, applications, etc., and is accessible by processor 404. Memory 406 is a hardware storage device capable of storing information on a temporary basis and/or a permanent basis. Memory 406 may comprise a random-access memory, or any other volatile or non-volatile storage device. User interface component 408 is a hardware component for interacting with an end user. For example, user interface component 408 may include a display 450, screen, touch screen, or the like (e.g., a Liquid Crystal Display (LCD), a Light Emitting Diode (LED) display, etc.). User interface component 408 may include a keyboard or keypad 452, a tracking device (e.g., a trackball or trackpad), a speaker, a microphone, etc. UE 110 may include various other components not specifically illustrated in FIG. 4.

UE 110 also includes a SIM 460, which is an integrated circuit that provides security and integrity functions for UE 110 (e.g., SIM card, Universal SIM (USIM), etc.). In this embodiment, SIM 460 includes or is provisioned with multiple subscription profiles 471-473 for UE 110, and each profile 471-473 has an associated subscription 481-483 and subscription parameters. Profiles 471-473 may include a variety of information, such as subscription credentials. Subscription credentials are a set of values that includes a long-term key(s) and the subscription identifier (e.g., Subscription Permanent Identifier (SUPI)) used to uniquely identify a subscription 481-483 and to mutually authenticate the UE 110 and a network. In this embodiment, processor 404 implements a subscription controller 434 that is configured to grant temporary use of a subscription 481-483 to a SIM-less device 120. A further description of the operation of UE 110 and subscription controller 434 is described below.

Figure 5:
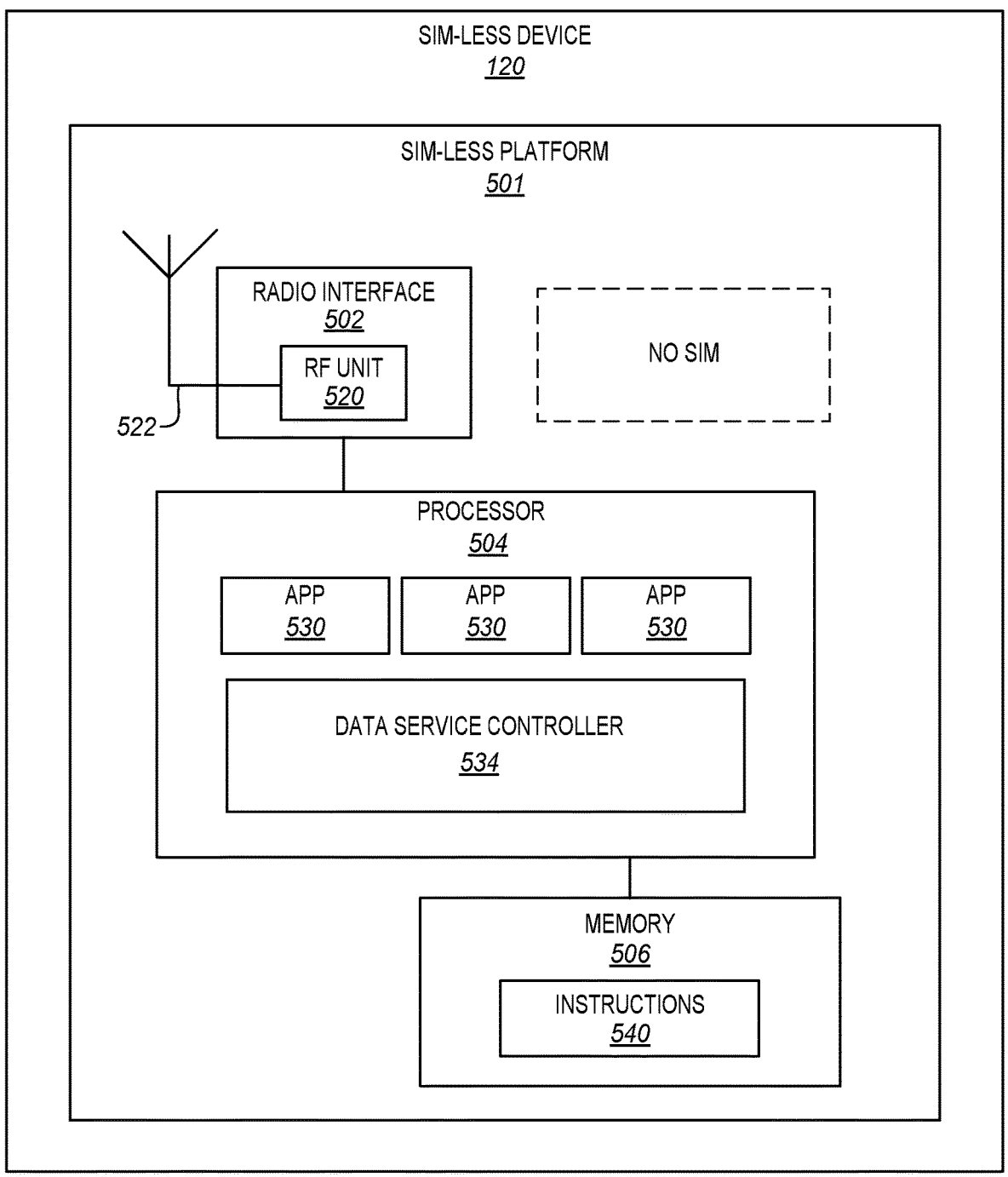
FIG. 5 is a block diagram of a SIM-less device in an illustrative embodiment.

FIG. 5 is a block diagram of a SIM-less device 120 in an illustrative embodiment. SIM-less device 120 is comprised of a SIM-less platform 501 configured to perform a data service, such as a digital media (i.e., streaming) service. SIM-less platform 501 is devoid of a SIM provisioned with a subscription to a cellular network 130 (as indicated by the dashed box). Thus, SIM-less device 120 does not have a subscription or associated subscription credentials enabling a data session with cellular network 130. SIM-less platform 501 includes a radio interface component 502, one or more processors 504, and a memory 506. Radio interface component 502 is a hardware component that represents the local radio resources of SIM-less device 120, such as an RF unit 520 (e.g., one or more radio transceivers) and one or more antennas 522. Radio interface component 502 may be configured for WiFi, Bluetooth, 5G NR, LTE, etc. Processor 504 represents the internal circuitry, logic, hardware, software, etc., that provides the functions of SIM-less device 120. Processor 504 may be configured to execute instructions 540 for software that are loaded into memory 506. Processor 504 may comprise a set of one or more processors or may comprise a multi-processor core, depending on the particular implementation. Memory 506 is a computer readable storage medium for data, instructions 540, applications, etc., and is accessible by processor 504. Memory 506 is a hardware storage device capable of storing information on a temporary basis and/or a permanent basis. Memory 506 may comprise a random-access memory, or any other volatile or non-volatile storage device. SIM-less device 120 may include various other components not specifically illustrated in FIG. 5.

Processor 504 may implement one or more applications 530 that provide data services. For example, one or more of applications 530 may provide a streaming audio or streaming video service. Processor 504 also implements a data service controller 534. Data service controller 534 is configured to request temporary use of a subscription 481-483 from UE 110 to access cellular network 130. As described above, SIM-less device 120 does not include a SIM provisioned with a subscription to cellular network 130. Data service controller 534 is configured to obtain temporary use of a subscription 481-483 from UE 110 to gain access to cellular network 130, such as when WiFi is not available to SIM-less device 120. A further description of the operation of SIM-less device 120 and data service controller 534 is described below.

Figure 6:
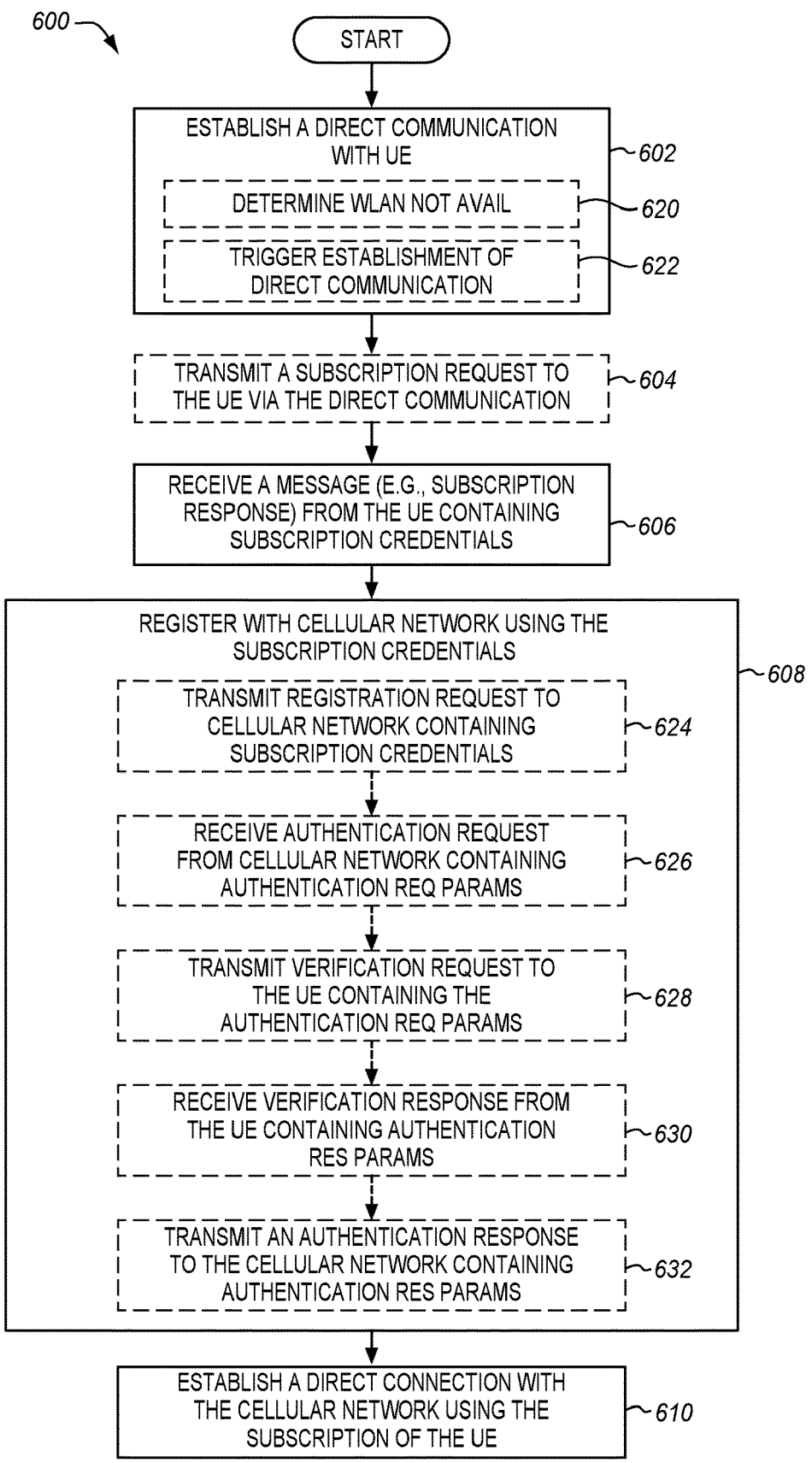
FIGS. 6-7 are flow charts illustrating a method of directly connecting a SIM-less device to a cellular network in an illustrative embodiment.
Figure 7:
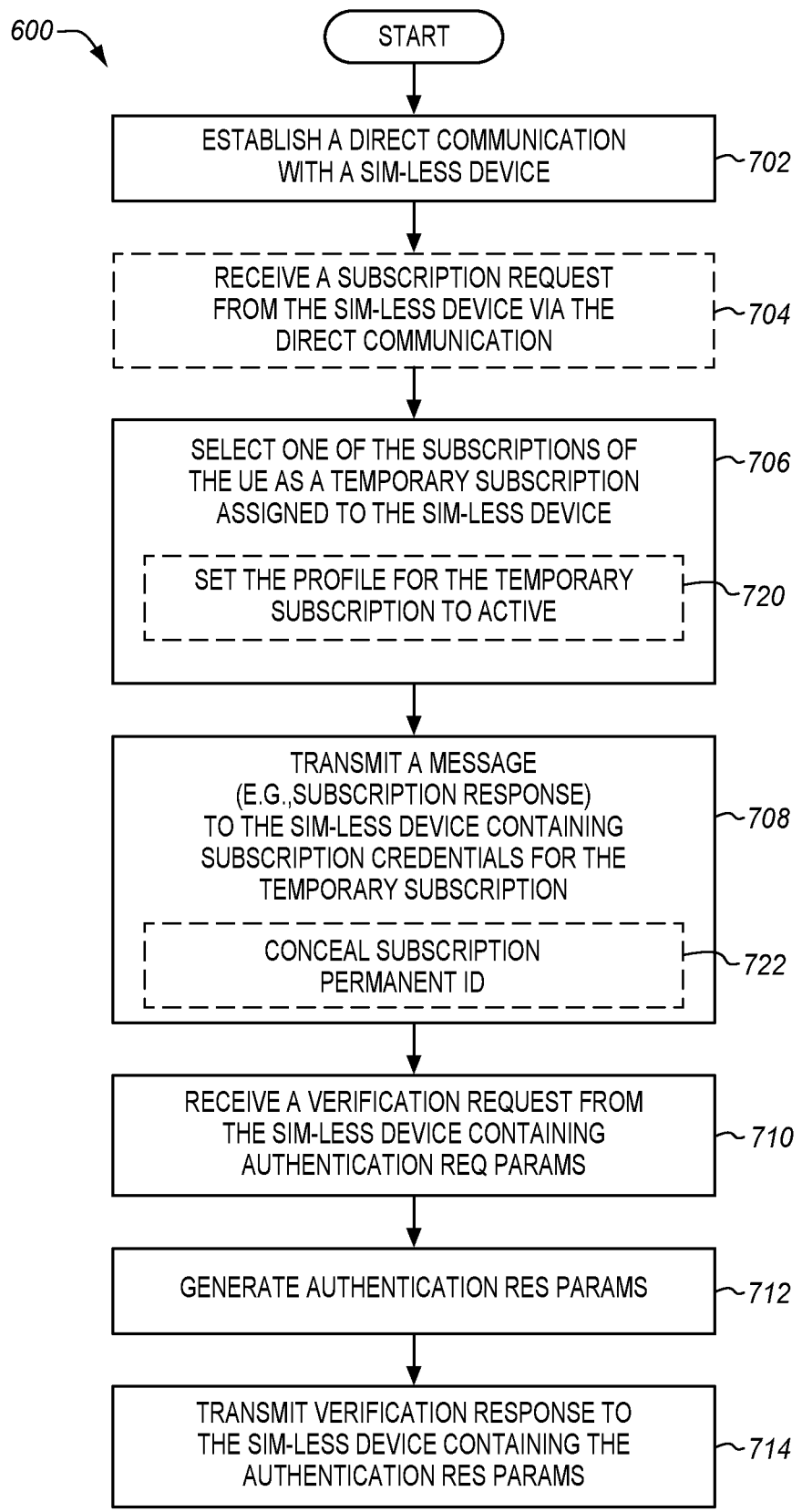

FIGS. 6-7 are flow charts illustrating a method 600 of directly connecting a SIM-less device 120 to a cellular network 130 in an illustrative embodiment. The steps of method 600 will be described with reference to UE 110 and SIM-less device 120 in FIGS. 4-5, but those skilled in the art will appreciate that method 600 may be performed in other systems. The steps of the flow charts described herein are not all inclusive and may include other steps not shown, and the steps may be performed in an alternative order.

FIG. 6 shows the steps/operations performed by SIM-less device 120 to facilitate a direct connection 222 with cellular network 130, and FIG. 7 shows the steps/operations performed by UE 110 to facilitate a direct connection 222 between SIM-less device 120 and cellular network 130. In FIGS. 6 and 7, SIM-less device 120 and UE 110 establish a direct communication 115 (step 602/step 702). For example, data service controller 534 of SIM-less device 120 may use a discovery procedure to identify a UE 110 in proximity. When a UE 110 is discovered, data service controller 534 may perform a direct communication procedure to establish a direct communication 115 with UE 110 (see also, FIG. 1). Direct communication 115 allows the devices to use local radio resources (i.e., radio transceivers) to communicate directly with each other without routing traffic through a core network, such as core network 330. SIM-less device 120 and UE 110 may be pre-provisioned with security credentials so that they can establish a secure direct communication 115.

Either SIM-less device 120 or UE 110 may trigger establishment of direct communication 115. For example, data service controller 534 may determine that a WLAN, a WiFi network, or other type of network that interfaces SIM-less device 120 with broadband network 140 is not available (optional step 620). Data service controller 534 may then trigger establishment of the direct communication 115 with UE 110 in response to a determination that the WLAN or the like is not available (optional step 622). In another example, data service controller 534 may determine that an application 530 has initiated a data service, such as streaming audio or streaming video, and the WLAN is not available to SIM-less device 120. In other examples, SIM-less device 120 or UE 110 may encounter other conditions that trigger establishment of the direct communication 115. In another embodiment, the end user may use a local application on one of SIM-less device 120 or UE 110 to trigger the establishment of the direct communication 115.

With the direct communication 115 established, data service controller 534 of SIM-less device 120 may transmit a subscription request to UE 110 via the direct communication 115 (optional step 604 of FIG. 6). A subscription request is configured to request access to a subscription 481-483 hosted in SIM 460 of UE 110. Data service controller 534 may include a variety of information in the subscription request. For example, data service controller 534 may include a serving network ID in the subscription request. Additionally or alternatively, data service controller 534 may include an indicator (e.g., a subscription ID) of a particular subscription 481-483 of UE 110 in the subscription request which SIM-less device 120 desires to access.

In FIG. 7, subscription controller 434 of UE 110 selects one of the subscriptions 481-483 of SIM 460 as a temporary subscription assigned to SIM-less device 120 (step 706). Subscription controller 434 may process the subscription profiles 471-473 associated with the subscriptions 481-483, along with any desired criteria, to determine whether SIM-less device 120 is authorized to access one of the subscriptions 481-483. When SIM-less device 120 is authorized, subscription controller 434 selects one of the subscriptions 481-483 (indicated as inactive) for use by SIM-less device 120. The trigger for subscription controller 434 to select a temporary subscription for SIM-less device 120 may vary as desired. In one embodiment, subscription controller 434 may select the temporary subscription in response to receiving a subscription request from SIM-less device 120 via the direct communication 115 (optional step 704). If SIM-less device 120 included an indicator (e.g., a subscription ID) of a particular subscription 481-483 in the subscription request, then subscription controller 434 may select the temporary subscription assigned to SIM-less device 120 based on the indicator in the subscription request. In other scenarios, subscription controller 434 may initiate a temporary subscription being selected for SIM-less device 120 absent a specific request from SIM-less device 120.

Subscription controller 434 accesses the subscription profile 471-473 of the temporary subscription, and sets the subscription profile 471-473 as active for use by SIM-less device 120 (optional step 720). Subscription controller 434 identifies the subscription credentials for the temporary subscription in the subscription profile 471-473, and transmits a message, request, response, etc., to SIM-less device 120 via the direct communication 115 containing the subscription credentials for the temporary subscription (step 708). In one embodiment, subscription controller 434 may transmit a subscription response to SIM-less device 120 via the direct communication 115 in response to a subscription request, where the subscription response contains the subscription credentials for the temporary subscription.

If SIM-less device 120 is not authorized for any of the subscriptions 481-483, all of the subscriptions 481-483 are presently active, or another condition is encountered not allowing selection of a subscription 481-483 for use by SIM-less device 120, then subscription controller 434 may transmit a subscription response or another message to SIM-less device 120 rejecting a subscription request.

The subscription credentials include a subscription ID used to uniquely identify a subscription 481-483. In one embodiment, the subscription ID may comprise a permanent identifier (e.g., SUPI), as opposed to a temporary identifier (e.g., Global Unique Temporary Identifier (GUTI)). Before sending a subscription permanent ID in the message (e.g., subscription response) to SIM-less device 120, subscription controller 434 may conceal, encode, or encrypt the subscription permanent ID in a subscription concealed ID (optional step 722), such as a Subscription Concealed Identifier (SUCI)). The subscription credentials sent from UE 110 to SIM-less device 120 may therefore include the subscription permanent ID concealed in the subscription concealed ID.

In FIG. 6, SIM-less device 120 receives a message (e.g., a subscription response) from UE 110 containing the subscription credentials for the temporary subscription granted to SIM-less device 120 by UE 110 (step 606). SIM-less device 120 may use the subscription credentials to set up a data session and a direct connection 222 with cellular network 130. Thus, data service controller 534 issues a request to cellular network 130 in order to register SIM-less device 120 with cellular network 130 using the subscription credentials provided by UE 110 (step 608). In one embodiment, as part of registration, data service controller 534 formats a registration request configured to register SIM-less device 120 with cellular network 130. Data service controller 534 inserts or includes the subscription credentials in the registration request along with any other desired or required information. SIM-less device 120 then transmits the registration request to cellular network 130 (optional step 624). In response to the registration request, cellular network 130 may perform authentication procedures. As part of the authentication procedures, cellular network 130 computes or derives authentication request parameters (e.g., authentication vector (AV)), and transmits an authentication request to SIM-less device 120 containing the authentication request parameters. SIM-less device 120 therefore receives the authentication request from cellular network 130 (optional step 626). The functionality for calculating an authentication response is contained in UE 110, so SIM-less device 120 transmits a verification request to UE 110 via the direct communication 115 containing the authentication request parameters generated by cellular network 130 (optional step 628).

In FIG. 7, UE 110 receives the verification request from SIM-less device 120 via the direct communication 115 (step 710). SIM 460 of UE 110 attempts to validate the authentication request from cellular network 130. For example, SIM 460 generates or computes authentication response parameters (e.g., response (RES) or response token) and UE validation parameters for an authentication request from cellular network 130 (step 712), and validates the authentication request from cellular network 130 by comparing authentication request parameters and the UE validation parameters for an authentication request from cellular network 130. UE 110 then transmits a verification response to SIM-less device 120 containing the authentication response parameters (step 714). UE 110 may insert or include other information in the verification response, such as keys, the subscription permanent ID, and/or other authentication data.

In FIG. 6, SIM-less device 120 receives the verification response from UE 110 containing the authentication response parameters generated by UE 110 (optional step 630). SIM-less device 120 then transmits an authentication response to cellular network 130 containing the authentication response parameters generated by UE 110 (optional step 632). From the authentication response, cellular network 130 continues with the authentication procedures. If authentication of SIM-less device 120 is successful, SIM-less device 120 and cellular network 130 may exchange additional signaling to set up a data session and establish a direct connection 222 based on the temporary subscription granted by UE 110 (step 610). The direct connection 222 is a cellular radio connection over the licensed spectrum or over 3GPP access. SIM-less device 120, using the authentication response parameters generated by UE 110, determines security material (e.g., ciphering and integrity protection parameters) to be used to exchange data and signaling over the direct connection 222 with cellular network 130. SIM-less device 120 may therefore send or receive data over the direct connection 222 with cellular network 130 to provide a data service. One technical benefit is that SIM-less device 120 may provide a data service through the direct connection 222 with cellular network 130 even though it is not equipped with a SIM and does not have a subscription with cellular network 130. A further benefit is that SIM-less device 120 does not have to be tethered to UE 110 to provide a data service, and data flows to or from SIM-less device 120 are not relayed through UE 110.

Figure 8:
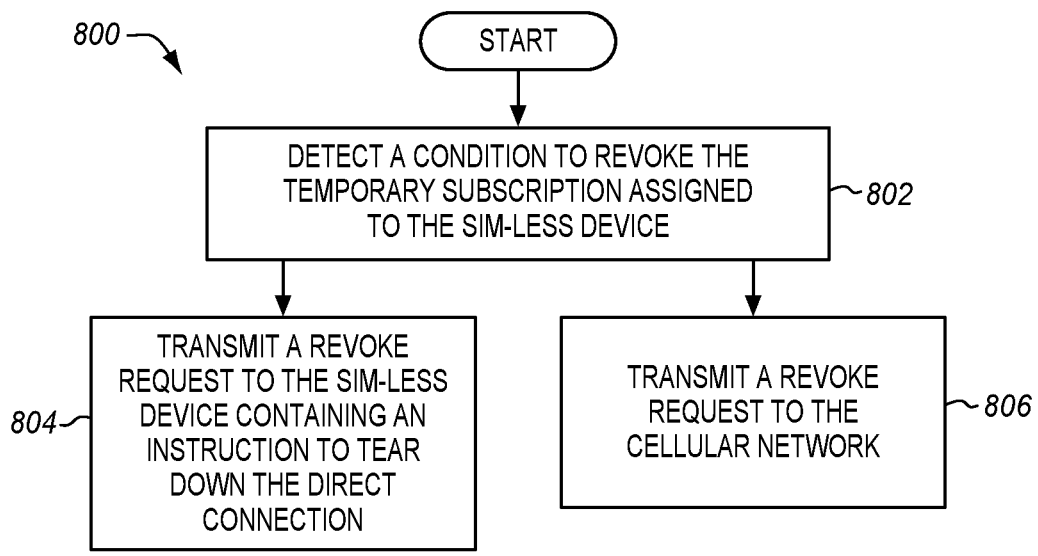
FIGS. 8-9 are flow charts illustrating a method of revoking a temporary subscription in an illustrative embodiment.
Figure 9:
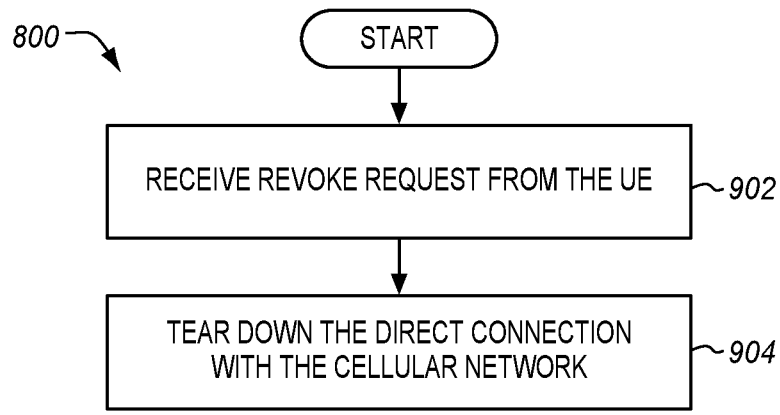

At any time, the temporary subscription granted to SIM-less device 120 may be revoked by the subscriber, UE 110, cellular network 130, and/or SIM-less device 120. FIGS. 8-9 are flow charts illustrating a method 800 of revoking a temporary subscription in an illustrative embodiment. In FIG. 8, subscription controller 434 of UE 110 detects a condition to revoke the temporary subscription assigned to SIM-less device 120 (step 802). For example, subscription controller 434 may monitor a time elapsed since the temporary subscription was granted, and revoke the temporary subscription after a threshold time period. In another example, subscription controller 434 may monitor a volume of data consumed by SIM-less device 120, and revoke the temporary subscription when the volume exceeds a threshold. In another example, subscription controller 434 may monitor a quota of service units consumed by SIM-less device 120, and revoke the temporary subscription when the quota exceeds a threshold. In yet other examples, subscription controller 434 may determine that the temporary subscription is needed by UE 110, a subscriber may use an application running on UE 110 to revoke the temporary subscription granted to SIM-less device 120, etc. When detecting a condition such as this or others in one embodiment, subscription controller 434 may transmit a revoke request to SIM-less device 120 via the direct communication 115 (step 804). The revoke request contains an instruction to tear down the direct connection 222 with cellular network 130. In another embodiment, subscription controller 434 may transmit a revoke request to cellular network 130 (step 806). The revoke request to cellular network 130 may comprise a request to tear down the direct connection 222 with SIM-less device 120. Additionally or alternatively, the revoke request may comprise a deregister request to deregister SIM-less device 120 from the temporary subscription. The revoke request contains the identifier (e.g., SUPI) of the subscription used by the direct connection 222 between SIM-less device 120 and cellular network 130. The revoke request may be validated by cellular network 130 to prevent the Denial of Service attack of one user revoking the service of another user.

Subscription controller 434 may also access the subscription profile 471-473 of the temporary subscription, and set the subscription profile 471-473 as inactive.

FIG. 9 illustrates the scenario where UE 110 transmits the revoke request to SIM-less device 120. In this scenario, SIM-less device 120 receives the revoke request from UE 110 (step 902). Data service controller 534 of SIM-less device 120 then tears down the direct connection 222 with cellular network 130 in response to the instruction contained in the revoke request (step 904). It is noted either UE 110 or SIM-less device 120 may initiate processes to revoke the temporary subscription used by SIM-less device 120. Also, the subscriber of UE 110 may revoke the temporary subscription of SIM-less device 120 through a web interface, a subscription portal, an application running on UE 110, etc.

EXAMPLE

Figure 10:
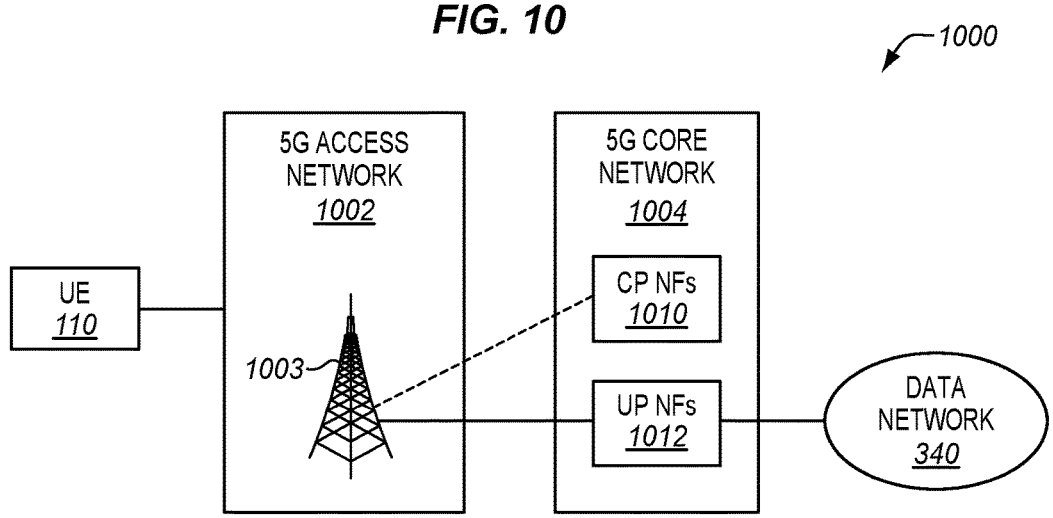
FIG. 10 illustrates a high-level architecture of a 5G network in an illustrative embodiment.

In one embodiment, SIM-less device 120 may register with a 5G network using a subscription of UE 110. FIG. 10 illustrates a high-level architecture of a 5G network 1000 in an illustrative embodiment. A 5G network 1000 is a communication system (e.g., a 3GPP system) comprising a 5G Access Network (AN) 1002, and a 5G Core Network (CN) 1004. Access network 1002 may comprise a NG-RAN and/or non-3GPP AN connecting to a 5G core network 1004. Access network 1002 may support E-UTRAN access (e.g., through an eNodeB, gNodeB, and/or ng-eNodeB 1003), WLAN access, fixed access, satellite radio access, new RAT, etc. Core network 1004 interconnects access network 1002 with a data network (DN) 340. Core network 1004 is comprised of Network Functions (NF), which may be implemented either as a network element on dedicated hardware, as a software instance running on dedicated hardware, or as a virtualized function instantiated on an appropriate platform (e.g., a cloud infrastructure). The network functions for the control plane (e.g., CP NF 1010) are separated from network functions for the user plane (e.g., UP NF 1012).

Figure 11:
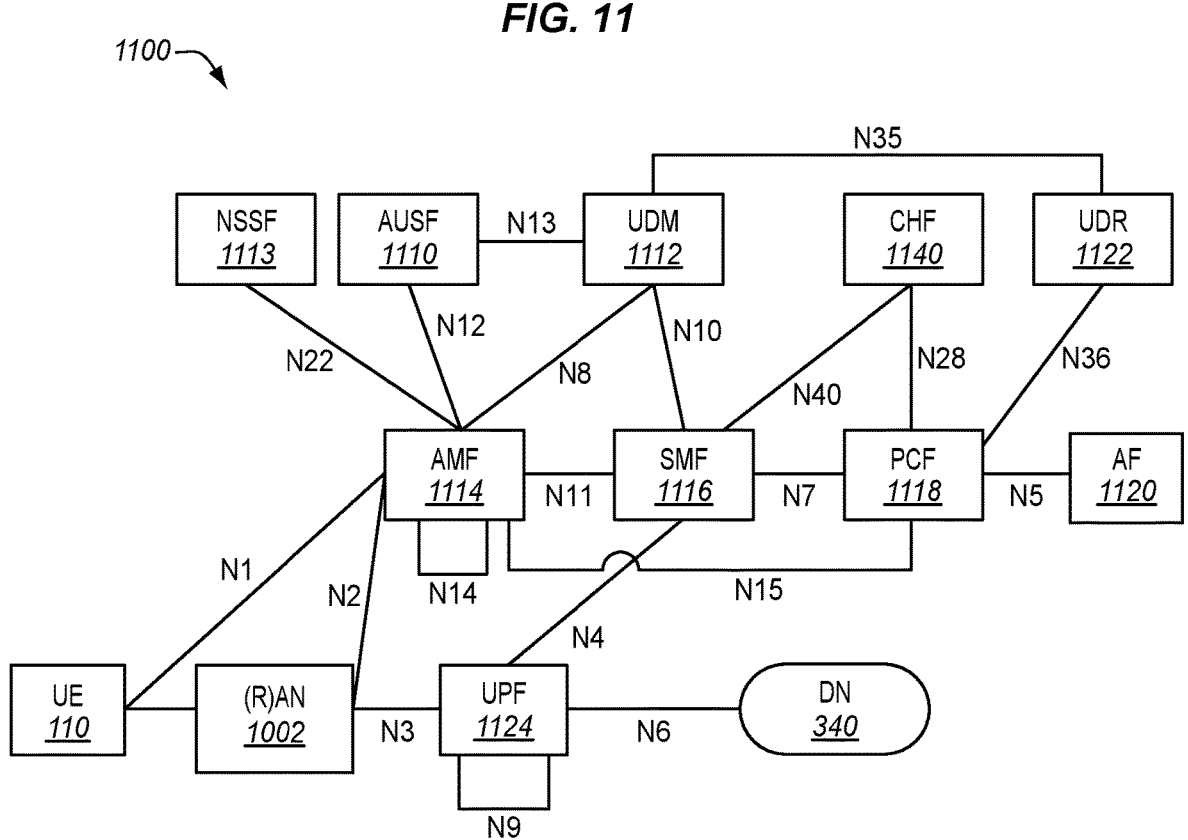
FIG. 11 illustrates a non-roaming architecture of a 5G network in an illustrative embodiment.

FIG. 11 illustrates a non-roaming architecture 1100 of a 5G network 1000 in an illustrative embodiment. The architecture in FIG. 11 is a reference point representation, as is further described in 3GPP TS 23.501 (v16.7.0), which is incorporated by reference as if fully included herein. The control plane of architecture 1100 includes an Authentication Server Function (AUSF) 1110, a Unified Data Management Network Function (UDM) 1112, a Unified Data Repository Network Function (UDR) 1122, a Network Slice Selection Function (NSSF) 1113, an Access and Mobility Management Function (AMF) 1114, a Session Management Function (SMF) 1116, a Policy Control Function (PCF) 1118, an Application Function (AF) 1120, and a Charging Function (CHF) 1140. The user plane of architecture 1100 includes one or more User Plane Functions (UPF) 1124 that communicate with a Data Network (DN) 340. A (Radio) Access Network ((R)AN) 1002 and UE 110 are able to access the control plane and the user plane of the 5G core network 1004.

AUSF 1110 is configured to support authentication of UE 110. UDM 1112 is configured to store subscription data/information for UE 110. UDM 1112 may store three types of user data: subscription, policy, and session-related context (e.g., UE location). UDR 1122 supports the following functionality: storage and retrieval of subscription data by UDM 1112, storage and retrieval of policy data by PCF 1118, storage and retrieval of structured data for exposure, etc. AMF 1114 is configured to provide UE-based authentication, authorization, mobility management, etc. SMF 1116 is configured to provide the following functionality: session management (SM), UE Internet Protocol (IP) address allocation and management, selection and control of UPF 1124, termination of interfaces towards PCF 1118, control part of policy enforcement and QoS, lawful intercept, termination of SM parts of NAS messages, Downlink Data Notification (DNN), roaming functionality, handle local enforcement to apply QoS for Service Level Agreements (SLAs), charging data collection and charging interface, etc. If UE 110 has multiple sessions, different SMFs may be allocated to each session to manage them individually and possibly provide different functionalities per session. PCF 1118 is configured to support a unified policy framework to govern network behavior, and to provide policy rules to control plane functions for QoS enforcement, charging, access control, traffic routing, etc. AF 1120 provides information on a packet flow to PCF 1118. Based on the information, PCF 1118 is configured to determine policy rules about mobility and session management to make AMF 1114 and SMF 1116 operate properly. CHF 1140 is configured to provide a converged online/offline charging solution for sessions/services accessed by UE 110.

UPF 1124 supports various user plane operations and functionalities as part of a service, such as packet routing and forwarding, traffic handling (e.g., QoS enforcement), an anchor point for Intra-RAT/Inter-RAT mobility (when applicable), packet inspection and policy rule enforcement, lawful intercept (UP collection), traffic accounting and reporting, etc. DN 340 is not part of the 5G core network 1004, and provides Internet access, operator services, 3rd party services, etc.

Architecture 1100 includes the following reference points. The N1 reference point is implemented between UE 110 and AMF 1114. The N2 reference point is implemented between (R)AN 1002 and AMF 1114. The N3 reference point is implemented between (R)AN 1002 and UPF 1124. The N4 reference point is implemented between the SMF 1116 and UPF 1124. The N5 reference point is implemented between PCF 1118 and AF 1120. The N6 reference point is implemented between UPF 1124 and DN 340. The N7 reference point is implemented between the SMF 1116 and PCF 1118. The N8 reference point is implemented between UDM 1112 and AMF 1114. The N9 reference point is implemented between two UPFs 1124. The N10 reference point is implemented between UDM 1112 and SMF 1116. The N11 reference point is implemented between AMF 1114 and SMF 1116. The N12 reference point is implemented between AMF 1114 and AUSF 1110. The N13 reference point is implemented between UDM 1112 and AUSF 1110. The N14 reference point is implemented between two AMFs. The N15 reference point is implemented between PCF 1118 and AMF 1114 in the case of a non-roaming scenario. The N22 reference point is implemented between NSSF 1113 and AMF 1114. The N28 reference point is implemented between CHF 1140 and PCF 1118, and the N40 reference point is implemented between CHF 1140 and SMF 1116. The N35 reference point is implemented between UDR 1122 and UDM 1112, and the N36 reference point is implemented between UDR 1122 and PCF 1118.

Figure 12:
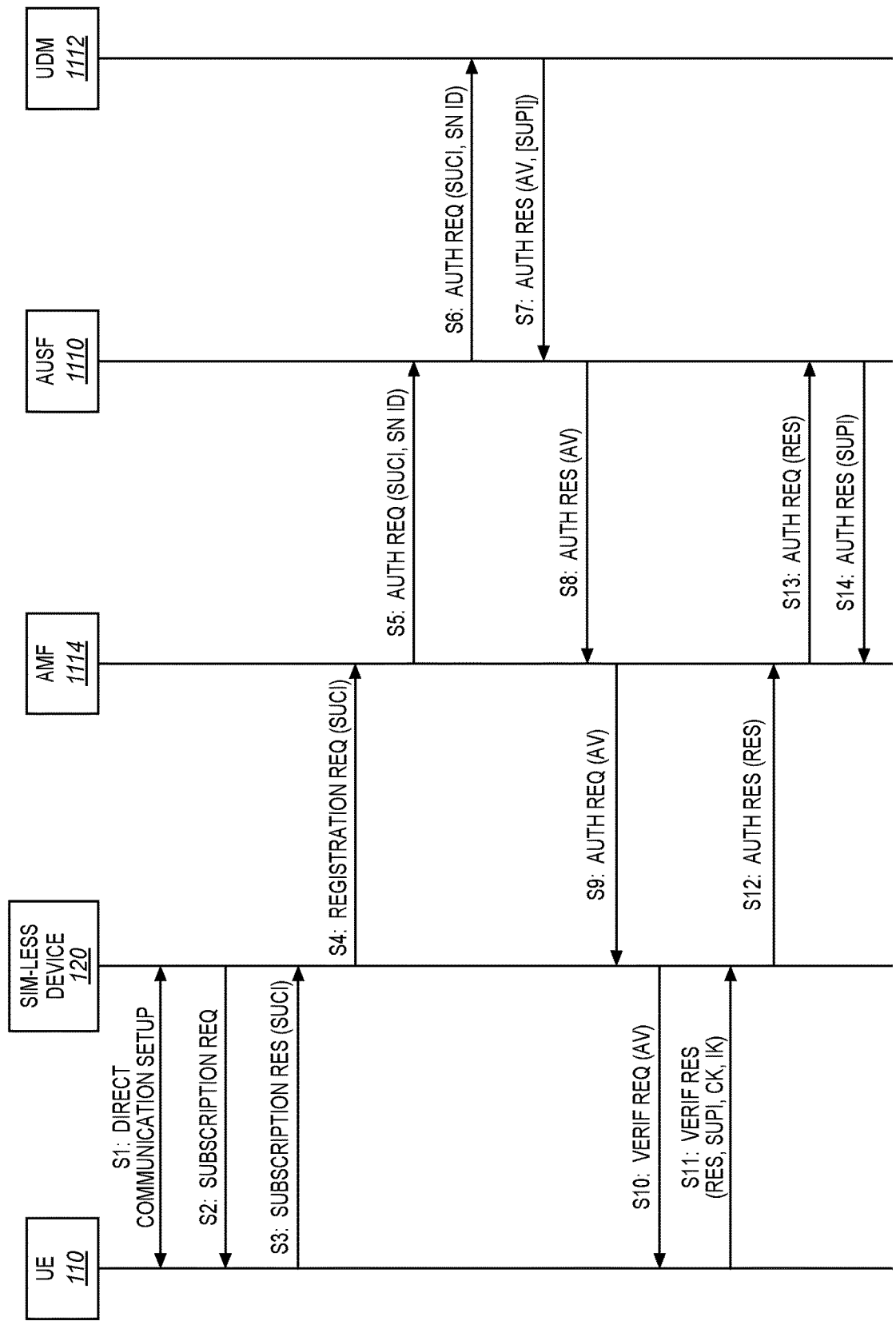
FIG. 12 is a message diagram illustrating registration of a SIM-less device with a 5G core network in an illustrative embodiment.

FIG. 12 is a message diagram illustrating registration of a SIM-less device 120 with a 5G core network 1004 in an illustrative embodiment. In this embodiment, it is again assumed that the SIM 460 of UE 110 is provisioned with a plurality of subscriptions 481-483. And, UE 110 is able to lend subscription credentials to SIM-less device 120 so that SIM-less device 120 can register with the 5G core network 1004. To start, UE 110 and SIM-less device 120 establish a direct communication 115 (S1). With the direct communication 115 established, SIM-less device 120 transmits a subscription request to UE 110 requesting access to or usage of a subscription of UE 110 (S2). For example, an application 530 on SIM-less device 120 may be activated that requires access to a data network to receive or transmit data. When a WiFi network or the like is not available, SIM-less device 120 may transmit the subscription request to UE 110 in an attempt to gain access to the 5G network 1000 using a subscription of UE 110. The subscription request may contain the serving network ID, a subscription ID indicating a desired subscription 481-483 of UE 110, or other information. The intention of the subscription ID is to ease the selection of a subscription 481-483 by UE 110.

In response to the subscription request, UE 110 determines whether the SIM-less device 120 is authorized to access one of the subscriptions 481-483. When SIM-less device 120 is not authorized, UE 110 may transmit a subscription response to SIM-less device 120 rejecting the subscription request. When SIM-less device 120 is authorized, UE 110 selects one of its subscriptions 481-483 as a temporary subscription assigned to SIM-less device 120. UE 110 accesses the subscription profile 471-473 of the temporary subscription, and sets the subscription profile 471-473 as active for use by SIM-less device 120. UE 110 also identifies the subscription credentials associated with the temporary subscription. For example, UE 110 identifies the subscription permanent ID (e.g., SUPI) assigned to the temporary subscription in the subscription profile 471-473, and generates a subscription concealed ID (e.g., SUCI) from the SUPI. UE 110 may generate the SUCI using an ECIES-based protection scheme with the public key of the home network of UE 110 that was securely provisioned to SIM 460. UE 110 then transmits a subscription response to SIM-less device 120 with the subscription credentials (e.g., SUCI) for the temporary subscription (S3).

SIM-less device 120 may then attempt to register with the 5G core network 1004 using the subscription credentials provided by UE 110. Thus, SIM-less device 120 transmits a registration request to AMF 1114 containing the subscription credentials (e.g., SUCI) for the temporary subscription (S4). AMF 1114 implements a Security Anchor Function (SEAF), that initiates an authentication procedure after receiving any signaling message from the UE Authentication and Key Agreement (AKA) protocol and procedures that support entity authentication, message integrity, and message confidentiality, among other security properties. The 3GPP AKA protocol is a challenge-and-response authentication protocol based on a symmetric key shared between a subscriber and a home network. After the mutual authentication between a subscriber and a home network, cryptographic keying materials are derived to protect subsequent communication between a subscriber and a serving network, including both signaling messages and user plane data (e.g., over radio channels). Therefore, in response to the registration request, AMF 1114 transmits an authentication request (i.e., Nausf_UEAuthentication_Authenticate Request) to AUSF 1110 containing the SUCI of the temporary subscription, the serving network ID, and/or other desired information (S5). In response to the authentication request, AUSF 1110 verifies that the serving network requesting the authentication service is authorized. Upon success, AUSF 1110 transmits an authentication request (i.e., Nudm_UEAuthentication_Get Request) to UDM 1112 containing the SUCI of the temporary subscription, the serving network ID, and/other desired information (S6).

UDM 1112 hosts functions related to the Authentication Credential Repository and Processing Function (ARPF). The ARPF decrypts the SUCI to obtain the SUPI of the temporary subscription, and selects the authentication method configured for the subscriber (e.g., 5G-AKA). The ARPF also computes or derives an authentication vector (AV) comprising an authentication token (AUTN), an expected response (XRES), a key ($K_{AUSF}$), and an authentication parameter (RAND). UDM 1112 transmits an authentication response (i.e., Nudm_UEAuthentication_Get Response) to AUSF 1110 containing the authentication vector, the SUPI, and/or any other desired information (S7). In response to the authentication response, AUSF 1110 stores the expected response (XRES) with the SUPI, and key ($K_{AUSF}$). AUSF 1110 computes a hash expected response (HXRES) from the expected response (XRES), and derives a key $K_{SEAF}$ from the stored key $K_{AUSF}$. AUSF 1110 replaces the expected response (XRES) with the hash expected response (HXRES), and the key $K_{AUSF}$ with the key $K_{SEAF}$ in the authentication vector. AUSF 1110 then transmits an authentication response (i.e., Nuasf_UEAuthentication_Authenticate Response) to AMF 1114 that includes the authentication vector (S8).

AMF 1114 (i.e., SEAF) stores the expected response token (HXRES), and sends an authentication request to SIM-less device 120 containing the authentication vector (S9). SIM-less device 120 is not able to authenticate to AMF 1114, so SIM-less device 120 transmits a verification request to UE 110 containing the authentication vector (S10). At receipt of the RAND and AUTN, SIM 460 of UE 110 verifies the freshness of the authentication vector by checking whether the authentication token (AUTN) can be accepted (see also, 3GPP TS 33.102 (v.16.0.0)). If so, SIM 460 computes a response (RES) or response token, and UE 110 transmits a verification response to SIM-less device 120 that includes the response (RES), the SUPI, keys (e.g., CK and IK), and any other desired information (S11).

SIM-less device 120 then transmits an authentication response to AMF 1114 that includes the response (RES) derived by UE 110 (S12). AMF 1114 (through the SEAF) computes a hash response (HRES) from the response (RES) generated by UE 110, and compares the hash response (HRES) to the hash expected response (HXRES). If they match, AMF 1114 considers the authentication successful from the serving network point of view. AMF 1114 then transmits another authentication request (i.e., Nausf_UEAuthentication_Authenticate Request) to AUSF 1110 containing the response (RES) generated by UE 110 and/or any other desired information (S13).

AUSF 1110 compares the response (RES) generated by UE 110 with the expected response (XRES). If they match, AUSF 1110 considers the authentication successful from the home network point of view. AUSF 1110 then sends an authentication response (i.e., Nausf_UEAuthentication_Authenticate Response) to AMF 1114 indicating success/failure of the authentication (S14). If the authentication was successful, the key $K_{SEAF}$ received in 5G authentication vector will become the anchor key in the sense of the key hierarchy. The authentication procedure as described above may be performed according to 3GPP specifications described in TS 33.501 (v17.0.0), which is incorporated by reference as if fully included herein.

When authentication is successful, SIM-less device 120 has been authenticated to 5G network 1000 and is able to register with the 5G core network 1004. SIM-less device 120 may then exchange further signaling with the 5G core network 1004 to establish a direct UP connection with the 5G core network 1004. For example, SIM-less device 120 may transmit NAS (Non-Access Stratum) SM (Session Management) Signaling over 3GPP access toward AMF 1114 and SMF 1116 to establish a Protocol Data Unit (PDU) session, such as described in 3GPP TS 24.501 (v17.1.0), which is incorporated by reference as if fully included herein. When the PDU session is established, SIM-less device 120 is able to exchange data traffic directly with the 5G core network 1004 via 3GPP access. Thus, data flows to or from SIM-less device 120 are not relayed through UE 110. Procedures for establishing a direction connection between SIM-less device 120 and 5G core network 1004 may be performed according to 3GPP specifications described in TS 23.501/TS 23.502 (v16.7.0), which are incorporated by reference as if fully included herein.

At any time during the data communication between 5G core network 1004 and SIM-less device 120, 5G core network 1004 may request to re-authenticate SIM-less device 120. Thus, SIM-less device 120 may interact with UE 110 in a similar manner discussed above to re-authenticate.

Also at any time, the temporary subscription granted to SIM-less device 120 may be revoked by the subscriber, UE 110, 5G network 1000, and/or SIM-less device 120. Assume for one example that UE 110 transmits a deregister request to 5G network 1000 requesting that the temporary subscription be revoked. AMF 1114 receives the deregister request, and propagates the deregister request to UDM 1112 (serving the UE 110). UDM 1112 validates the deregister request to prevent the Denial of Service attack of one user revoking the service of another user. UDM 1112 interacts with UDR 1122 to determine whether the subscription of UE 110 allows it to revoke the temporary subscription identified (e.g., by a SUPI) in the deregister request. If this is the case, UDM 1112 transmits a deregister notification to AMF 1114 (e.g., Nudm_UECM_DeregistrationNotification) with the SUPI of the temporary subscription identified in the deregister request, the Access Type, the Removal Reason (set to Subscription Withdrawn), etc. SIM-less device 120 will therefore be removed from the temporary subscription, and the direct connection 222 with the 5G core network 1004 will be torn down.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. User Equipment (UE), comprising:
a Subscriber Identity Module (SIM) provisioned with a plurality of subscription profiles for subscriptions to a cellular network;
at least one radio transceiver configured to communicate via radio signals; and
at least one processor and memory;
the at least one processor causes the UE to:
establish a direct communication with a SIM-less device using the at least one radio transceiver, wherein the SIM-less device does not have a subscription with the cellular network;
select one of the subscriptions provisioned in the SIM as a temporary subscription assigned to the SIM-less device to allow the SIM-less device to establish a direct connection with the cellular network using the temporary subscription; and
transmit a message to the SIM-less device via the direct communication containing subscription credentials for the temporary subscription.

2. The UE of claim 1 wherein the at least one processor causes the UE to:
receive a subscription request from the SIM-less device via the direct communication requesting access to a subscription provisioned in the SIM;
select the temporary subscription assigned to the SIM-less device in response to receiving the subscription request; and
transmit a subscription response to the SIM-less device via the direct communication containing the subscription credentials for the temporary subscription.

3. The UE of claim 2 wherein:
the subscription request from the SIM-less device includes an indicator of a particular subscription provisioned in the SIM; and
the at least one processor causes the UE to:
select the temporary subscription assigned to the SIM-less device based on the indicator in the subscription request.

4. The UE of claim 1 wherein:
the subscription credentials include a subscription permanent identifier; and
the at least one processor causes the UE to:
conceal the subscription permanent identifier in a subscription concealed identifier; and
transmit the message to the SIM-less device via the direct communication containing the subscription concealed identifier.

5. The UE of claim 1 wherein the at least one processor causes the UE to:
set a subscription profile for the temporary subscription as active for use by the SIM-less device.

6. The UE of claim 1 wherein the at least one processor causes the UE to:
receive a verification request from the SIM-less device via the direct communication containing authentication request parameters generated by the cellular network;
generate authentication response parameters; and
transmit a verification response to the SIM-less device via the direct communication containing the authentication response parameters.

7. The UE of claim 1 wherein the at least one processor causes the UE to:
detect a condition to revoke the temporary subscription assigned to the SIM-less device; and
transmit a revoke request to the SIM-less device via the direct communication containing an instruction to tear down the direct connection with the cellular network.

8. The UE of claim 1 wherein the at least one processor causes the UE to:
detect a condition to revoke the temporary subscription assigned to the SIM-less device; and
transmit a revoke request to the cellular network to tear down the direct connection with the SIM-less device.

9. The UE of claim 8 wherein:
the revoke request comprises a deregister request to deregister the SIM-less device from the temporary subscription.

10. A method of operating User Equipment (UE) to facilitate a direct connection between a SIM-less device and a cellular network, wherein the UE includes a Subscriber Identity Module (SIM) provisioned with a plurality of subscription profiles for subscriptions to the cellular network, the method comprising:
establishing a direct communication with the SIM-less device using a radio transceiver in the UE, wherein the SIM-less device does not have a subscription with the cellular network;
selecting one of the subscriptions provisioned in the SIM as a temporary subscription assigned to the SIM-less device to allow the SIM-less device to establish the direct connection with the cellular network using the temporary subscription; and
transmitting a message from the UE to the SIM-less device via the direct communication containing subscription credentials for the temporary subscription.

11. The method of claim 10 further comprising:
receiving a subscription request at the UE from the SIM-less device via the direct communication requesting access to a subscription provisioned in the SIM;
wherein selecting one of the subscriptions provisioned in the SIM as the temporary subscription assigned to the SIM-less device comprises selecting the temporary subscription in response to receiving the subscription request; and wherein transmitting the message from the UE to the SIM-less device via the direct communication comprises transmitting a subscription response from the UE to the SIM-less device via the direct communication containing the subscription credentials for the temporary subscription.

12. The method of claim 11 wherein:
the subscription request from the SIM-less device includes an indicator of a particular subscription provisioned in the SIM; and
selecting one of the subscriptions provisioned in the SIM as the temporary subscription assigned to the SIM-less device comprises selecting the temporary subscription assigned to the SIM-less device based on the indicator in the subscription request.

13. The method of claim 10 wherein:
the subscription credentials include a subscription permanent identifier;
the method further comprises concealing the subscription permanent identifier in a subscription concealed identifier; and
transmitting the message from the UE to the SIM-less device via the direct communication comprises transmitting the message from the UE to the SIM-less device via the direct communication containing the subscription concealed identifier.

14. The method of claim 10 further comprising:
receiving a verification request at the UE from the SIM-less device via the direct communication containing authentication request parameters generated by the cellular network;
generating authentication response parameters at the UE; and
transmitting a verification response from the UE to the SIM-less device via the direct communication containing the authentication response parameters.

15. The method of claim 10 further comprising:
detecting a condition to revoke the temporary subscription assigned to the SIM-less device; and
transmitting a revoke request from the UE to the SIM-less device via the direct communication containing an instruction to tear down the direct connection with the cellular network.

16. The method of claim 10 further comprising:
detecting a condition to revoke the temporary subscription assigned to the SIM-less device; and
transmitting a revoke request from the UE to the cellular network to tear down the direct connection with the SIM-less device.

17. A non-transitory computer readable medium embodying programmed instructions executed by a processor of User Equipment (UE), wherein the instructions direct the processor to implement a method of operating the UE to facilitate a direct connection between a SIM-less device and a cellular network, wherein the UE includes a Subscriber Identity Module (SIM) provisioned with a plurality of subscription profiles for subscriptions to the cellular network, the method comprising:
establishing a direct communication with the SIM-less device using a radio transceiver in the UE, wherein the SIM-less device does not have a subscription with the cellular network;
selecting one of the subscriptions provisioned in the SIM as a temporary subscription assigned to the SIM-less device to allow the SIM-less device to establish the direct connection with the cellular network using the temporary subscription; and
transmitting a message from the UE to the SIM-less device via the direct communication containing subscription credentials for the temporary subscription.

18. The computer readable medium of claim 17 wherein the method further comprises:
receiving a subscription request at the UE from the SIM-less device via the direct communication requesting access to a subscription provisioned in the SIM;
wherein selecting one of the subscriptions provisioned in the SIM as the temporary subscription assigned to the SIM-less device comprises selecting the temporary subscription in response to receiving the subscription request; and
wherein transmitting the message from the UE to the SIM-less device via the direct communication comprises transmitting a subscription response from the UE to the SIM-less device via the direct communication containing the subscription credentials for the temporary subscription.

19. The computer readable medium of claim 17 wherein:
the subscription credentials include a subscription permanent identifier;
the method further comprises concealing the subscription permanent identifier in a subscription concealed identifier; and
transmitting the message from the UE to the SIM-less device via the direct communication comprises transmitting the message from the UE to the SIM-less device via the direct communication containing the subscription concealed identifier.

20. The computer readable medium of claim 17 wherein the method further comprises:
receiving a verification request at the UE from the SIM-less device via the direct communication containing authentication request parameters generated by the cellular network;
generating authentication response parameters at the UE; and
transmitting a verification response from the UE to the SIM-less device via the direct communication containing the authentication response parameters.

* * * * *